C. I. HELM.
TREE PROTECTOR.
APPLICATION FILED APR. 2, 1913.
1,075,255.
Patented Oct. 7, 1913.
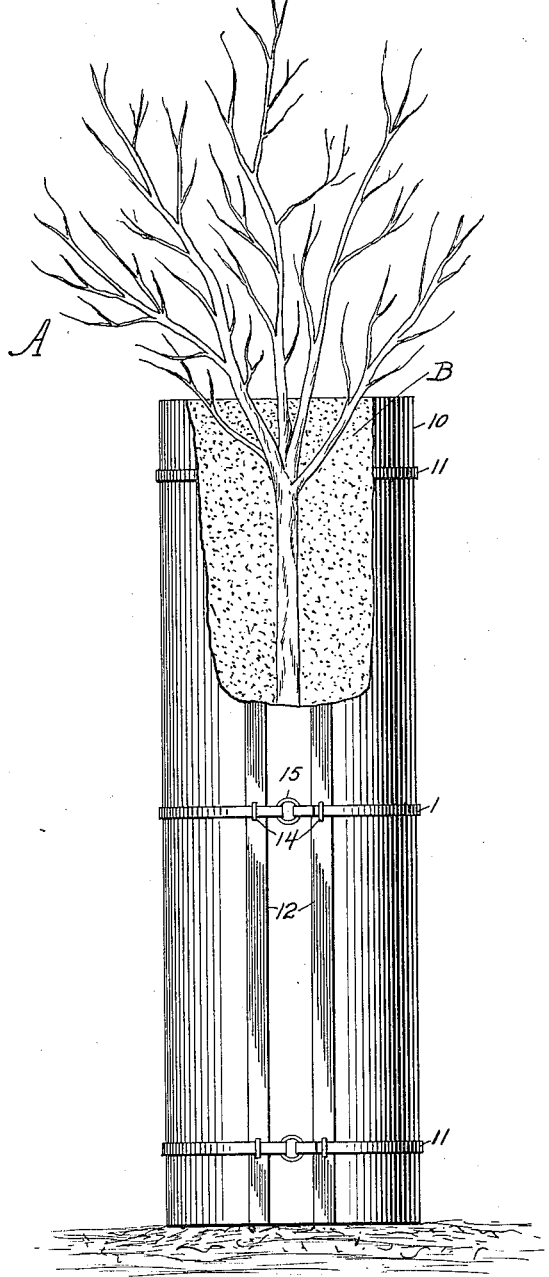
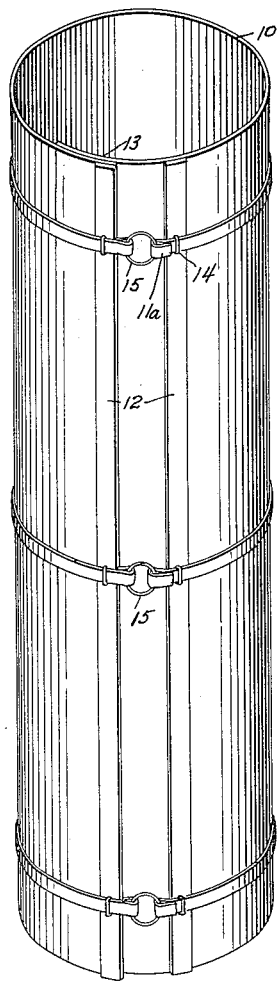
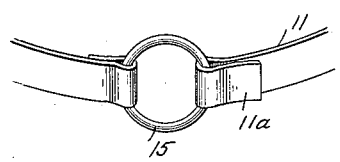
Fig. 1
Fig. 2
Fig. 3
WITNESSES
F. D. Sweet
J. L. McAuliffe
INVENTOR
Charles I. Helm
BY Munn & Co
ATTORNEYS
COLUMBIA PLANOGRAPH CO., WASHINGTON, D. C.

UNITED STATES PATENT OFFICE.

CHARLES I. HELM, OF PHOENIX, ARIZONA.

TREE-PROTECTOR.

1,075,255. Specification of Letters Patent. Patented Oct. 7, 1913.

Application filed April 2, 1913. Serial No. 758,332.

*To all whom it may concern:*

Be it known that I, CHARLES I. HELM, a citizen of the United States, and a resident of Phoenix, in the county of Maricopa and State of Arizona, have invented a new and Improved Tree-Protector, of which the following is a full, clear, and exact description.

My invention relates particularly to a tree protector adapted to be employed for protecting young trees, such as citrus fruit trees, from damage by frost. It is necessary in the case of citrus trees to protect the tender trunk as far as the crown, which may be done by banking up the earth to the desired height. The killing of the branches is not of so great moment, since the tree can be saved and will be merely set back, but when the trunk is killed by freezing and bursting, the loss is a very serious matter.

It is a design of my invention to provide a protector by which the tree can be thoroughly protected, the protector being adapted to extend from the ground to the branches of the tree, and to hold a cylindrical body of earth extending around the tree trunk at all sides to the crown and among the branches.

The invention will be particularly explained in the specific description following.

Reference is to be had to the accompanying drawings forming a part of this specification, in which similar characters of reference indicate corresponding parts in all the views.

Figure 1 is a side elevation showing my improved protector applied to a tree, part of the device being broken out to indicate the dirt filling; Fig. 2 is a perspective view of the protector; and Fig. 3 is an enlarged detail of the fastening means for holding the protector in the closed position.

In constructing the device in accordance with my invention, a body is provided, consisting of a sheet 10, which may be formed of sheet metal, building paper, soft wood, yucca palm, rotary veneer, or other suitable material. The sheet is given such dimensions as to reach to a height that its upper end will be above the crown of the young tree A, while the bottom rests upon the ground and is of a width that when brought into substantially cylindrical form, it will surround the tree trunk and leave a space for a filling B of dirt.

The sheet is provided with cleats 12 extending vertically, the one at one edge of the sheet and the other a distance from the edge, so that the ends of the sheet will overlap, one end 13 beyond its cleat extending beneath the opposite edge.

Tie bands 11, which may be metallic strips, extend around the body in suitable number, three being shown, and these may be secured to the cleats 12 by staples 14. To fasten the ends of the bands one end of each strip or band 11 carries a loop preferably in the form of a ring 15, which may be secured by returning the end of the strap inwardly, as shown, and the opposite end of the strap is returned in an outward direction as at $11^a$, forming a resilient hook which is adapted to be engaged with the ring 15. The cleats 12 may be spaced apart when the sheet is brought into cylindrical form, leaving a clearance space therebetween for the convenient manipulation of the fasteners in placing and removing the protector.

My improved device affords a very effective protector in constituting a holder for the earth filling B, thus insuring that the dirt will surround the tree to the proper height to protect the complete trunk and so much of the branches as may be deemed necessary, and serves to retain the filling of dirt intact, until it is desired to remove the same. The device can be cheaply produced and very conveniently applied and removed.

Having thus described my invention, I claim as new, and desire to secure by Letters Patent:

A protector, comprising a sheet adapted to be bent into substantially cylindrical form, a cleat applied to one vertical edge of the sheet, a second cleat secured a distance from the opposite edge of the sheet leaving the projecting edge to underlie the first-mentioned edge, and bands on said sheet, the bands being secured adjacent to the ends thereof to the mentioned cleats, one projecting end of each band carrying a loop and the other projecting end of each band being in hook form and adapted to engage in said loop, so that in the fastened position of the protector the cleats will be spaced apart and afford clearance, for the convenient fastening and unfastening of the protector.

In testimony whereof I have signed my name to this specification in the presence of two subscribing witnesses.

CHARLES I. HELM.

Witnesses:
  Jos. Johnston,
  Louise V. Housel.